(12) United States Patent
Handa

(10) Patent No.: US 8,345,527 B2
(45) Date of Patent: Jan. 1, 2013

(54) OPTICAL PHASE CONTROLLER AND OPTICAL PHASE CONTROL METHOD

(75) Inventor: Yoichiro Handa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 170 days.

(21) Appl. No.: 12/548,266

(22) Filed: Aug. 26, 2009

(65) Prior Publication Data

US 2010/0054105 A1    Mar. 4, 2010

(30) Foreign Application Priority Data

Aug. 29, 2008  (JP) ................. 2008-221119

(51) Int. Cl.
*G11B 7/00*    (2006.01)
(52) U.S. Cl. .......... 369/112.01; 359/486.01; 359/486.02
(58) Field of Classification Search ........................ None
See application file for complete search history.

(56) References Cited

U.S. PATENT DOCUMENTS

| 6,949,732 B2 * | 9/2005 | Kiguchi et al. | 250/216 |
| 2005/0073744 A1 * | 4/2005 | Zheludev et al. | 359/489 |
| 2006/0262398 A1 | 11/2006 | Sangu | |
| 2010/0177383 A1 * | 7/2010 | Kamada et al. | 359/485 |

FOREIGN PATENT DOCUMENTS

| JP | 11-337733 A | 12/1999 |
| JP | 2007-240617 A | 9/2007 |

OTHER PUBLICATIONS

Tao Li et al., "Manipulating Optional Rotation in Extraordinary Transmission by Hybrid Plasmonic Excitations," Applied Physics Letters, vol. 93, Jul. 15, 2008, pp. 021110-1-021110-3.

* cited by examiner

*Primary Examiner* — Joseph Haley
(74) *Attorney, Agent, or Firm* — CUSA U.S.A, Inc. IP Division

(57) ABSTRACT

An optical phase controller includes an optical phase control element so that a phase of incident light applied to the optical phase control element is controlled. The optical phase control element includes a metal structure having anisotropy in a first direction and a second direction perpendicular to the first direction within an electric-field vibration plane of the incident light, the wavelength of the incident light includes a plasmon resonance wavelength possessed by the metal structure, and the incident light is linearly polarized light or elliptically polarized light simultaneously having polarized components in the first direction and the second direction perpendicular to the first direction.

10 Claims, 5 Drawing Sheets

OPTICAL PHASE CONTROLLER AND OPTICAL PHASE CONTROL METHOD

BACKGROUND OF THE INVENTION

1. Field of the Invention

The present invention relates to an optical phase controller which controls a phase at a predetermined wavelength or wavelength band, and an optical phase control method.

2. Description of the Related Art

Materials with birefringence, such as quartz, calcite, polymer stretch films, and the like, have been used for wave plates.

Such materials have optical axes of ordinary light and extraordinary light and the propagation velocity of incident light varies according to the optical axes because refractive index varies according to the optical axes.

Therefore, a phase difference occurs in light transmitted through such a material. In order to allow the material to function as a wave plate, a ½ wave plate and a ¼ wave plate require a phase difference of 180° and a phase difference of 90°, respectively, and thus require thicknesses corresponding to the phase differences.

Wave plates having such characteristics are used for various optical devices and measurements, such as antireflection of pickup lenses and lasers of CD, DVD, and the like, optical measurements such as ellipsometry, laser interferometers, optical shutters, image projectors such as liquid crystal projectors and the like.

When a wave plate is used for antireflection of pickup lenses and lasers of CD, DVD, and the like, the wave plate may function for only the wavelength of output light. However, a wave plate having a wavelength band may be required for ellipsometry, liquid crystal projectors, and the like.

A material having birefringence has been allowed to function as a wave plate. However, in this case, it is difficult to achieve a wide band in view of the wavelength dispersion of the material.

In order to resolve this problem, a wave plate referred to as an "achromatic wave plate" has been developed, in which a plurality of wave plates are combined so that the optical axes are perpendicular to each other.

This wave plate permits a relatively wide wavelength band to be realized by combining materials having different wavelength dispersions (refer to, for example, Japanese Patent Laid-Open No. 11-337733).

In addition, US 2006/0262398A proposes a polarization control element which controls polarization using the fact that a phase difference occurs between metal microstructures due to near-field interaction between the metal microstructures.

In the achromatic wave plate disclosed in Japanese Patent Laid-Open No. 11-337733, a plurality of materials are combined so that the optical axes are perpendicular to each other, and thus combining accuracy is important.

In addition, the materials for the wave plate are limited to those having birefringence, and thus the cost is increased. Further, since a difference in refractive index between ordinary light and extraordinary light is small, the thickness of the wave plate is increased for achieving a predetermined phase difference, thereby causing limitation of the degree of freedom of design.

Further, when a wave plate using an organic material such as a polymer stretch film or the like is used for an optical device with large light source energy, such as a projector, a problem with heat resistance and light resistance may occur.

Further, in the polarization control element using at least two metal microstructures disclosed in US 2006/0262398A, the strength of near-field interaction can be controlled by adjusting the distance between the metal microstructures, thereby permitting polarization control with a high degree of design freedom.

However, when used for a wave plate, a sufficient phase difference (e.g., a phase difference of 90° for a ¼ wave plate) is required, it is thought to be necessary that a distance between the metal microstructures is several nm.

In order to form the element while controlling the distance between the metal microstructures to several nm, high precision is required, and thus variation easily occurs in the distance between the metal microstructures, thereby failing to perform predetermined polarization control. It is also pointed out that the production cost is increased.

SUMMARY OF THE INVENTION

The present invention provides an optical phase controller including a thin film, capable of phase control at a predetermined wavelength or wavelength band, and excellent in heat resistance and light resistance, and provides an optical phase control method.

The present invention provides an optical phase controller and an optical phase control method configured as described below.

An optical phase controller of the present invention includes an optical phase control element so that a phase of incident light applied to the optical phase control element is controlled. The optical phase control element includes a metal structure having anisotropy in a first direction and a second direction perpendicular to the first direction within an electric-field vibration plane of the incident light, the wavelength of the incident light includes a plasmon resonance wavelength possessed by the metal structure, and the incident light is linearly polarized light or elliptically polarized light simultaneously having polarized components in the first direction and the second direction perpendicular to the first direction.

In the optical phase controller of the present invention, the wavelength band of the incident light includes a wavelength band between the plasmon resonance wavelength in the first direction and the plasmon resonance wavelength in the second direction, and a phase difference of the incident light between the first direction and the second direction in the wavelength band is substantially constant.

In the optical phase controller of the present invention, when the plasmon resonance wavelength in the first direction is shorter than the plasmon resonance wavelength in the second direction, the polarization axis of the incident light rotates at a wavelength near the plasmon resonance wavelength in the first direction, which is shorter than the plasmon resonance wavelength in the first direction and at which the phase difference becomes zero, or a wavelength near the plasmon resonance wavelength in the second direction, which is longer than the plasmon resonance wavelength in the second direction and at which the phase difference becomes zero.

In the optical phase controller of the present invention, the metal structures in the optical phase control element are two-dimensionally arranged.

In the optical phase controller of the present invention, the metal structures are coated with a coating layer composed of a dielectric material.

In the optical phase controller of the present invention, the metal structures have any one of the shapes of a rectangular parallelepiped, an ellipse, a pyramid, a cylinder, a cone, a cross, and a ring, or a combination thereof.

An optical phase control method of the present invention is to control a phase of incident light applied to an optical phase control element. The optical phase control method includes, when the incident light is applied to a metal structure included in the optical phase control element and having anisotropy in a first direction and a second direction perpendicular to the first direction within a field vibration plane of the incident light, the step of controlling the incident light so that the light simultaneously has polarized components in the first direction and the second direction, and the step of applying the incident light controlled in the control step on the optical phase control element.

In the optical phase control method of the present invention, optical phase control is performed so that the wavelength band of the incident light includes a wavelength band between the plasmon resonance wavelength in the first direction and the plasmon resonance wavelength in the second direction, and a phase difference of the incident light between the first direction and the second direction is substantially constant in the wavelength band.

In the optical phase control method of the present invention, when the plasmon resonance wavelength in the first direction is shorter than the plasmon resonance wavelength in the second direction, optical phase control is performed so that the phase difference of the incident light between the first direction and the second direction becomes zero at a wavelength near the plasmon resonance wavelength in the first direction, which is shorter than the plasmon resonance wavelength in the first direction and at which the phase difference becomes zero, or a wavelength near the plasmon resonance wavelength in the second direction, which is longer than the plasmon resonance wavelength in the second direction and at which the phase difference becomes zero, and the polarization axis of the incident light is rotated.

According to the present invention, it is possible to realize an optical phase controller capable of phase control at a predetermined wavelength or wavelength band and including an optical phase control element excellent in heat resistance and light resistance, which can be formed using a thin film, and an optical phase control method.

Further features of the present invention will become apparent from the following description of exemplary embodiments with reference to the attached drawings.

BRIEF DESCRIPTION OF THE DRAWINGS

FIGS. 2A to 2C are diagrams illustrating phase changes with changes in plasmon resonance conditions in an optical phase controller according to an embodiment of the present invention, in which FIG. 2A is a conceptual diagram showing transmission spectra by irradiation of a metal structure, FIG. 2B is a conceptual diagram showing phase change spectra, and FIG. 2C is a conceptual diagram showing a phase difference spectrum.

FIGS. 5A and 5B are graphs showing the results of numerical calculation in irradiation of an optical phase control element according to an embodiment of the present invention, in which FIG. 5A is a graph showing transmission spectra, and FIG. 5B is a graph showing phase change and phase difference spectra.

DESCRIPTION OF THE EMBODIMENTS

An embodiment of the present invention is described below.

The present invention should not be given a limited interpretation based on embodiments and examples described below.

For example, even when the materials, composition conditions, reaction conditions, members, element arrangement, and the like, which are described in the embodiments and examples below, are freely changed within an understandable range for persons skilled in the art, the present invention can be carried out.

Figure 1:
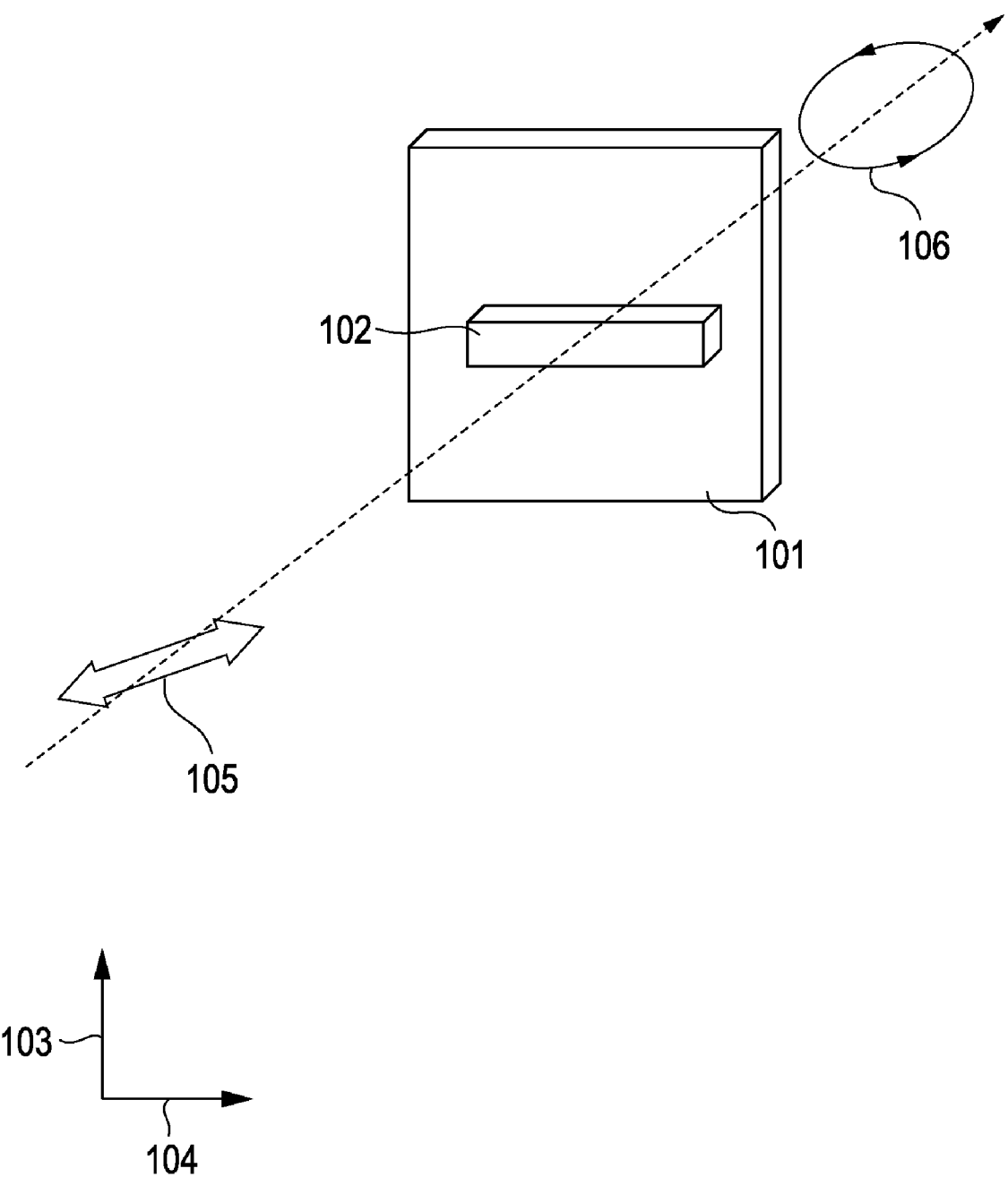
FIG. 1 is a conceptual diagram illustrating a configuration of an optical phase controller according to an embodiment of the present invention.

FIG. 1 is a conceptual diagram illustrating a configuration of an optical phase controller according to an embodiment of the present invention.

In FIG. 1, reference numeral 101 denotes an optical phase control element; reference numeral 102, a metal structure; reference numeral 103, a minor axis direction; reference numeral 104, a major axis direction; reference numeral 105, incident light; and reference numeral 106, transmitted light.

The optical phase controller of the embodiment includes the optical phase control element 101 which includes the metal structure 102.

The metal structure 102 has anisotropy in the two perpendicular directions 103 and 104.

The anisotropy of the metal structure in the present invention is described.

In the present invention, as described above, the expression "has anisotropy" represents that a metal structure has different sizes in two perpendicular directions within an electric-field vibration plane of incident light applied to the metal structure.

In this structure, plasmon resonance conditions in the major axis direction are different from those in the minor axis direction of the metal structure having anisotropy.

Figure 2A:
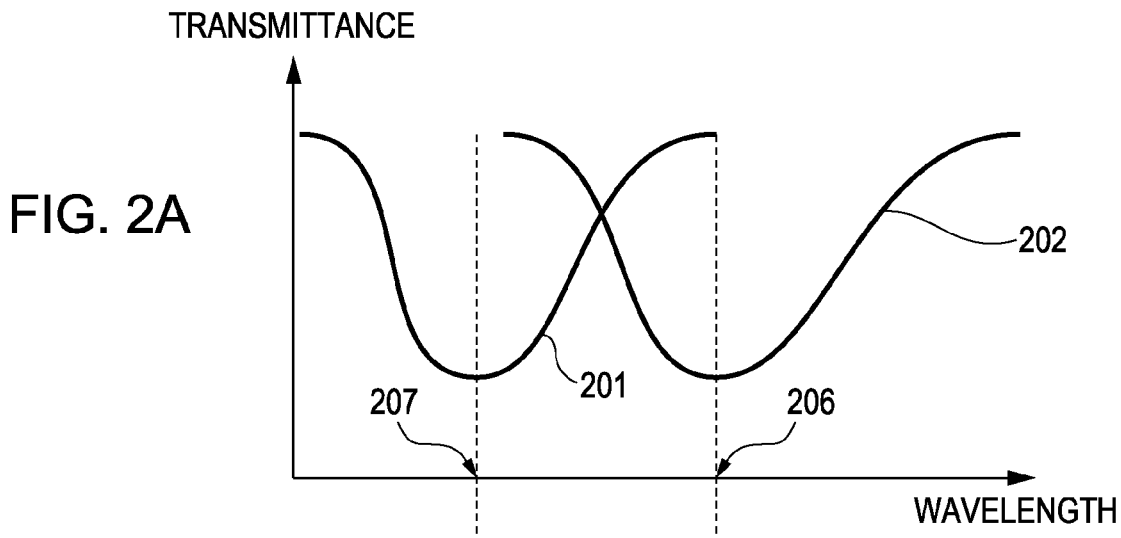

Next, a phase change with change in the plasmon resonance conditions is described. FIG. 2A is a conceptual diagram showing transmission spectra when with linearly polarized light which vibrates only in each of the major axis direction and the minor axis direction of the metal structure 102 is incident on the single metal structure 102.

In FIG. 2A, reference numeral 201 shows a transmission spectrum when incident light is linearly polarized light which vibrates in the minor axis direction, and reference numeral 202 shows a transmission spectrum when incident light is linearly polarized light which vibrates in the major axis direction. In addition, reference numerals 206 and 207 each denote the plasmon resonance wavelength.

When linearly polarized light which vibrates in the minor axis direction is applied, the transmission spectrum is as shown by reference numeral 201. On the other hand, when linearly polarized light which vibrates in the major axis direction is applied, the transmission spectrum is as shown by reference numeral 202.

In the transmission spectrum 201, decrease in transmittance appears on the short wavelength side, while in the transmission spectrum 202, decrease in transmittance appears on the long wavelength side.

Such a decrease in transmittance is caused by a plasmon resonance phenomenon.

The plasmon resonance phenomenon is a phenomenon in which incident light and free electrons in a metal structure resonantly vibrate.

The light transmitted through the metal structure is subjected to a phase shift by this phenomenon in a wavelength band contributing to plasmon resonance.

The phase shift is described below. It is generally known that light (electromagnetic wave) at position z is represented by the following expression:

$$E = E0 \exp[i(kz - wt)]$$

E0: amplitude
k: wave number
z: position (propagation direction of light)
w: angular frequency
t: time In this case, "kz−wt" represents a phase.

It is found that the phase shifts with the position, time, and the like. In addition, the phase is shifted to "kz−wt+Δϕ" by an external factor. That is, the phase is shifted by the influence of plasmon resonance.

Figure 2B:
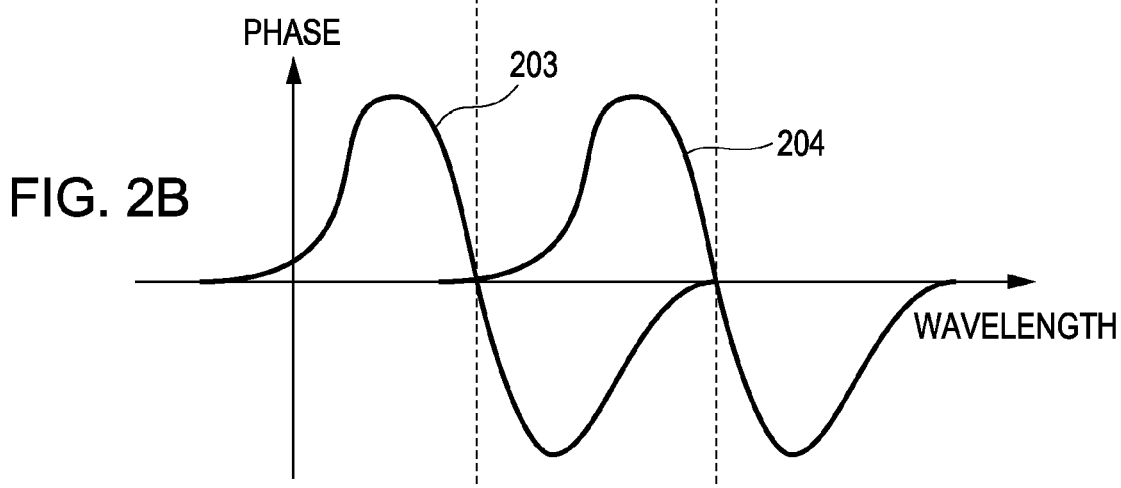

Therefore, plots of the phase of light transmitted through the metal structure 102 at a position and a time against wavelength are as shown by FIG. 2B.

In FIG. 2B, reference numeral 203 shows a phase shift spectrum when incident light is linearly polarized light which vibrates in the minor axis direction, and reference numeral 204 shows a phase shift spectrum when incident light is linearly polarized light which vibrates in the major axis direction.

The wavelength dependency of the phase is due to the wavelength dependency of plasmon resonance. Namely, Δϕ has the wavelength dependency.

When linearly polarized light which vibrates in the minor axis direction is incident light transmitted through the metal structure shows phase shifts as shown by reference numeral 203. While when linearly polarized light which vibrates in the major axis direction is incident light transmitted through the metal structure shows phase shifts as shown by reference numeral 204.

Figure 2C:
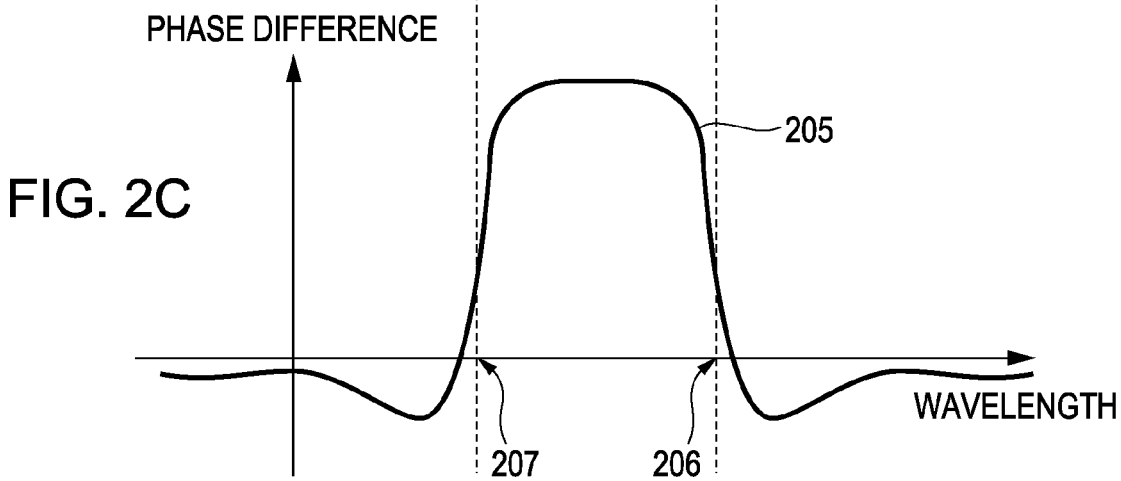
Figure 3A:
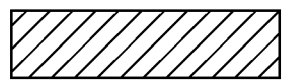
FIGS. 3A to 3F are drawings each illustrating the shape of a metal structure constituting an optical phase control element according to an embodiment of the present invention.
Figure 3B:
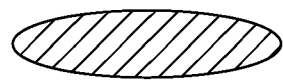
Figure 3C:
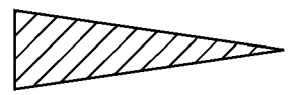
Figure 3D:
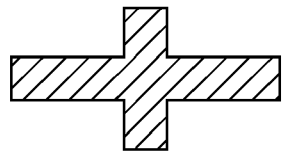
Figure 3E:
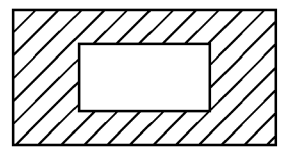
Figure 3F:
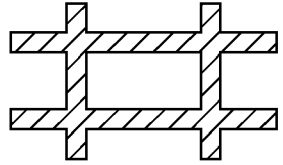

When linearly polarized light simultaneously including a polarized component vibrating in the minor axis direction and a polarized component vibrating in the major axis direction, e.g., linearly polarized light inclined at 45° with respect to the minor axis direction or the major axis direction, is applied, a phase difference is as shown by FIG. 2C.

In FIG. 2C, reference numeral 205 shows a phase difference spectrum. This spectrum has a wavelength band in which the phase difference is substantially constant and a wavelength at which the phase difference is substantially zero.

The wavelength band in which the phase difference is substantially constant is the wavelength band between the plasmon resonance wavelength 206 when polarized light vibrating in the major direction is applied and the plasmon resonance wavelength 207 when polarized light vibrating in the minor direction is applied.

When the phase difference is plotted against wavelength as shown in FIG. 2C, the wavelength band can also be referred to as the "wavelength band between the wavelength at which the phase difference abruptly rises and the wavelength at which the phase difference abruptly drops".

The wavelength at which the phase difference is substantially zero is a wavelength near the plasmon resonance wavelength on the long wavelength side longer than the plasmon resonance wavelength (longer than 206) or a wavelength near the plasmon resonance wavelength on the short wavelength side shorter than the plasmon resonance wavelength (shorter than 207).

The metal structure is allowed to function as a retardation film or wave plate having a wavelength band in the wavelength band in which the phase difference is substantially constant.

When linearly polarized light is applied, transmitted light is also linearly polarized light at the wavelength at which the phase difference is substantially zero.

In this case, transmittance decreases in the wavelength band in which plasmon resonance occurs, and thus the ratio between transmittances in the major axis direction and the minor axis direction is changed to a ratio of incident light. The change of the ratio of transmittances with a phase difference of zero corresponds to rotation of the axis of effective polarized light. Namely, the metal structure can be allowed to function as a rotator at the wavelength at which the phase difference is zero.

The wavelength band in which the phase difference is constant and the wavelength at which the phase difference is zero depend on the degree of overlap between the transmission spectrum 201 and the transmission spectrum 202.

By adjusting the degree of overlap, the phase difference can be made constant in a predetermined wavelength band, and the polarization axis can be rotated at a predetermined wavelength.

Although, in the above-described single metal structure, the shape difference becomes constant and becomes zero, metal structures may be two-dimensionally arranged.

When metal structures may be two-dimensionally arranged, a condensing optical system for applying incident light on only a single metal structure is not required, thereby increasing the degree of freedom of an optical system.

Next, the metal structure, the dielectric coating layer, etc. which constitute the optical phase controller of the embodiment are described.

First, the metal structure is described. In this embodiment, a metal exhibiting the plasmon resonance phenomenon can be used as a constituent material of the metal structure.

Examples of such a metal include gold, silver, copper, aluminum, platinum, and zinc, an alloy composed of two or more of these elements, and an alloy containing at least one of these elements.

The metal structure may have any shape as long as it has anisotropy. Examples of the shape include the shapes shown in FIG. 3, such as (a) a rectangular parallelepiped, (b) an ellipse, (c) a pyramid, a cylinder (not shown), a cone (not shown), and the like.

Also, (d) a cross or (f) a double cross which has a crossing portion and different lengths for respective polarized components, (e) a ring having a circular portion, or a combination thereof may be used.

In this embodiment, the periphery of the metal structure can be coated with a dielectric layer. When the periphery of the metal structure is coated with the dielectric coating layer, it is possible to prevent widening of a peak or splitting of a peak due to a difference in plasmon resonance conditions at an interface of the metal structure.

In addition, it is possible of prevent a change of the plasmon resonance conditions due to adhesion of dust or the like to the metal structure.

The dielectric coating layer can be composed of a material having high transmittance. Examples of the material include silica, quartz, PMMA (polymethyl methacrylate), polystyrene, amorphous fluorocarbon resin, ITO (indium tin oxide), silicon nitride, and the like.

From the viewpoint of manufacture, the metal structure may be formed on a substrate composed of a material having high transmittance.

In this embodiment, the incident light applied to the optical phase control element is linearly polarized light or elliptically polarized light simultaneously having polarized components in the first direction and the second direction perpendicular to the first direction in the metal structure with anisotropy.

In this embodiment, the optical phase controller may be configured to have a light source which applies the polarized light or an optical element such as a polarizer having the function to convert external light to the polarized light.

The optical phase control method according to the embodiment of the present invention includes the following steps: The method includes, when the incident light is applied to a metal structure included in the optical phase control element and having anisotropy in a first direction and a second direction perpendicular to the first direction within an electric-field vibration plane of the incident light, the step of controlling the incident light so that the light simultaneously has polarized components in the first direction and the second direction, and the step of applying the incident light controlled in the control step on the optical phase control element. In order to convert the incident light to polarized light, a polarizer may be used, or a light source which is incident polarized light may be used.

In order that the incident light has polarized components in the first and second directions of the metal structure, a polarizer, a light source which is incident polarized light, or a drive mechanism for rotating an optical control element may be provided. Optical phase control can be performed by applying incident polarized light on the optical phase control element, the polarized light being adjusted in the above-described step to simultaneously have the polarized components in the first and second directions of the metal structure.

EXAMPLE

An example of the present invention described below. In this example, an optical phase controller including a rectangular metal structure serving as an optical phase control element is described with reference to FIGS. 4A, 4B, 5A, 5B.

Figure 4A:
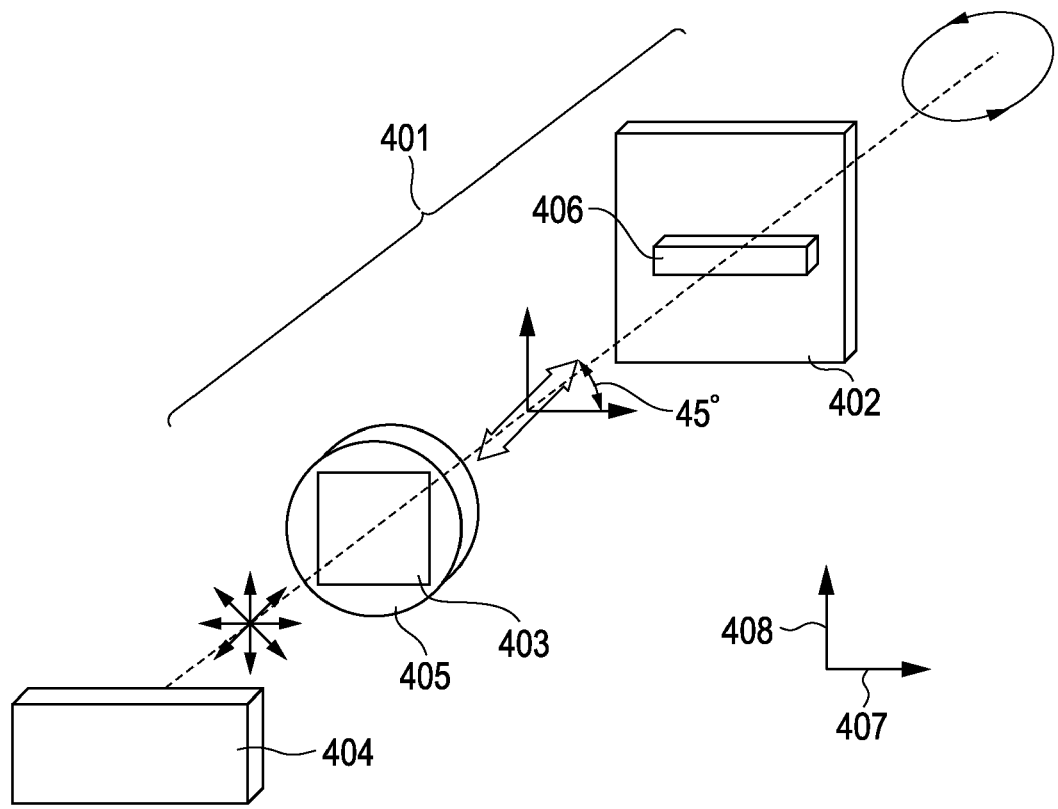
FIGS. 4A and 4B schematic diagrams illustrating a configuration of an optical phase controller according to an embodiment of the present invention.

FIG. 4A is a conceptual diagram illustrating a configuration of an optical phase controller 401 of this example. In FIG. 4A, reference numeral 401 denotes an optical phase controller; reference numeral 402, an optical phase control element; reference numeral 403, a polarizer; reference numeral 404, a light source; reference numeral 405, a rotation mechanism; reference numeral 406, a metal structure; reference numeral 407, a first direction; and reference numeral 408, a second direction.

In this example, the optical phase controller 401 includes the optical phase control element 402 and the polarizer 403 for adjusting the incident light to polarized light.

The polarizer 403 includes the rotation mechanism 405 for adjusting the polarized light so that it vibrates in both the major axis direction 407 and the minor axis direction 408 of the rectangular metal structure 406. The rotation mechanism 405 may be attached to the polarizer 403 or the optical phase control element 402.

Next, a configuration example in which metal structures 402 are two-dimensionally arranged in the optical phase control element 402 of this example is described with reference to FIG. 4B.

Figure 4B:
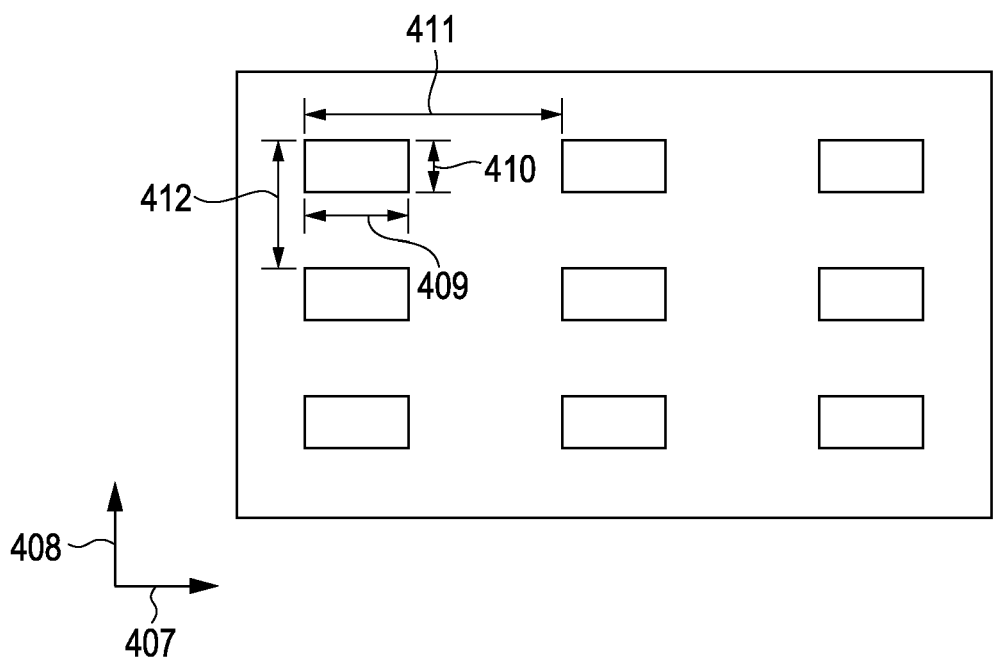

In FIG. 4B, reference numeral 407 denotes the first direction; reference numeral 408, the second direction; reference numeral 409, the size in the first direction; reference numeral 410, the size in the second direction; reference numeral 411, the arrangement period in the first direction; and reference numeral 412, the arrangement period in the second direction.

The material, size, and arrangement period of the metal structures two-dimensionally arranged in this example are as follows:

As a material of the metal structures, gold is used. The size 409 in the first direction is 200 nm, and the size 410 in the second direction is 100 nm. The thickness is 20 nm, the arrangement period 411 in the first direction is 500 nm, and the arrangement period 412 in the second direction is 250 nm.

Figure 5A:
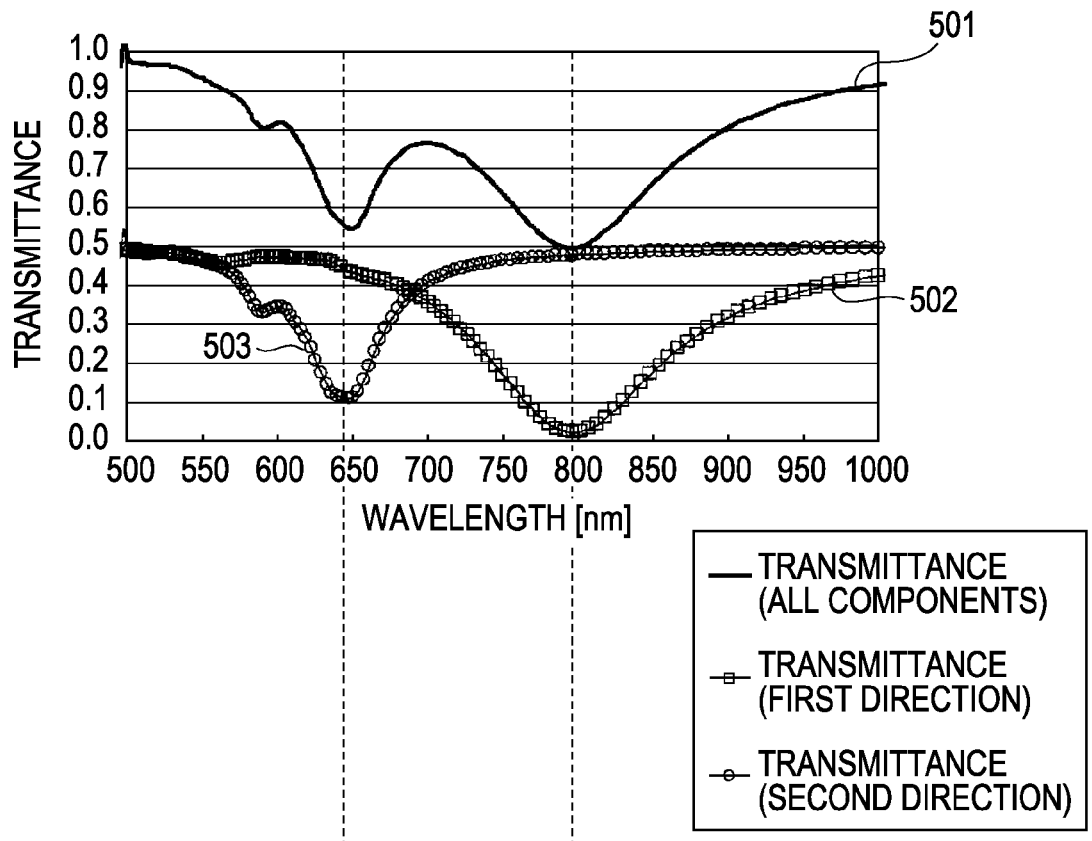
Figure 5B:
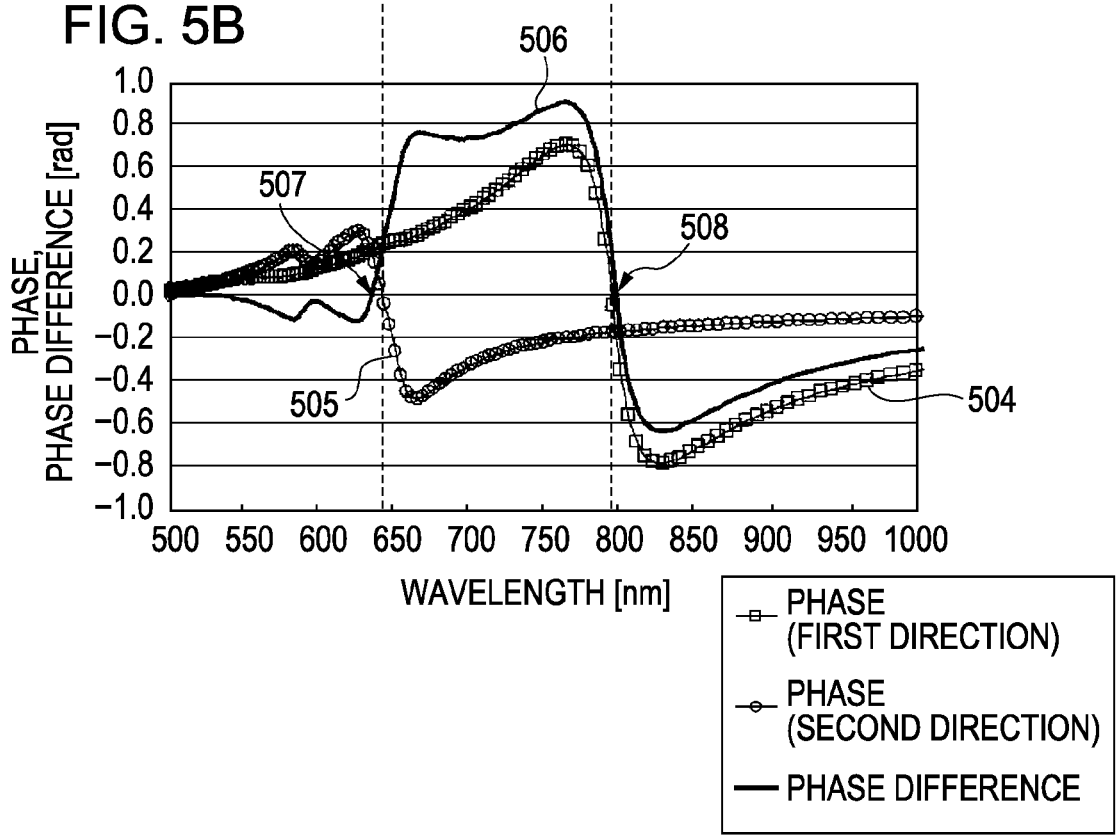

FIGS. 5A and 5B are graphs showing the results of numerical calculation when linearly polarized light inclined at 45° with respect to the first direction is incident on the optical phase control element of this example. FIG. 5A shows transmission spectra, in which reference numeral 501 shows a transmission spectrum of all components, and reference numerals 502 and 503 show transmission spectra of the components in the first and second directions, respectively. FIG. 5B shows phase shifts 504 and 505 of the transmission spectra 502 and 503, and phase difference spectrum 506 of the phase shifts 504 and 505.

FIG. 5B indicates that in the phase difference spectrum 506, a phase difference from 660 nm to 780 nm is about 0.8 rad, i.e., about 45°.

When another optical phase control element is provided in the propagation direction of light, the phase difference is 90°, thereby permitting the function as a ¼ wave plate.

FIG. 5B also shows wavelengths 507 and 508 at which the phase difference becomes zero near the plasmon resonance wavelength. When the phase difference is zero, transmitted light is linearly polarized light because the incident light in this example is linearly polarized light.

However, in the incident light, the magnitudes of electric-field amplitudes in the first and second directions are the same, while the transmittances of the transmission spectra 502 and 503 are different. This represents that the vibration axis of the polarized light rotates. The vibration axis of the polarized light vibrating in the first direction rotates at the wavelength 507 at which the phase difference becomes zero, and the vibration axis of the polarized light vibrating in the second direction rotates at the wavelength 508 at which the phase difference becomes zero.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Patent Application No. 2008-221119 filed Aug. 29, 2008, which is hereby incorporated by reference herein in its entirety.

What is claimed is:

1. A controller comprising a control element so that a phase of incident light applied to the control element is controlled, wherein the control element includes a metal structure composed of a single member having different sizes in a first direction and a second direction respectively, the second direction being perpendicular to the first direction within an electric-field vibration plane of the incident light; a wavelength of the incident light includes a plasmon resonance wavelength possessed by the metal structure; and the incident light is linearly polarized light, wherein a transmission spectrum of the linearly polarized light is based on one of a major axis and a minor axis in which the linearly polarized light is applied to, wherein when the plasmon resonance wavelength in the first direction is shorter than the plasmon resonance wavelength in the second direction, a polarization axis of the incident light rotates at a wavelength near the plasmon resonance wavelength in the first direction, which is shorter than the plasmon resonance wavelength in the first direction and at which the phase difference becomes zero, or a wavelength near the plasmon resonance wavelength in the second direction, which is longer than the plasmon resonance wavelength in the second direction and at which the phase difference becomes zero.

2. The controller according to claim 1,
wherein a wavelength band of the incident light includes a wavelength band between the plasmon resonance wavelength in the first direction and a plasmon resonance wavelength in the second direction; and
a phase difference of the incident light between the first direction and the second direction is substantially constant in the wavelength band.

3. The controller according to claim 1, wherein metal structures in the control element are two-dimensionally arranged.

4. The controller according to claim 1, wherein metal structures are coated with a coating layer composed of a dielectric material.

5. The controller according to claim 1, wherein metal structures have any one of the shapes of a rectangular parallelepiped, an ellipse, a pyramid, a cylinder, a cone, a cross, and a ring, or a combination thereof.

6. A method of controlling a phase of incident light applied to a control element, the method comprising, when the incident light is applied to a metal structure composed of a single member included in the control element and having different sizes in a first direction and a second direction respectively, the second direction being perpendicular to the first direction within an electric-field vibration plane of the incident light, a wavelength of incident light including a plasmon resonance wavelength possessed by the metal structure: controlling the incident light so that the light simultaneously has polarized components in the first direction and the second direction, the incident light being a linearly polarized light; and applying the controlled incident light on the optical phase control element, wherein a transmission spectrum of the linearly polarized light is based on one of a major axis and a minor axis in which the linearly polarized is applied to, wherein when the plasmon resonance wavelength in the first direction is shorter than the plasmon resonance wavelength in the second direction, optical phase control is performed so that a phase difference of the incident light between the first direction and the second direction becomes zero at a wavelength near the plasmon resonance wavelength in the first direction, which is shorter than the plasmon resonance wavelength in the first direction and at which the phase difference becomes zero, or a wavelength near the plasmon resonance wavelength in the second direction, which is longer than the plasmon resonance wavelength in the second direction and at which the phase difference becomes zero, and the polarization axis of the incident light is rotated.

7. The method according to claim 6, wherein a wavelength band of the incident light includes a wavelength band between the plasmon resonance wavelength in the first direction and the plasmon resonance wavelength in the second direction, and a phase difference of the incident light between the first direction and the second direction is substantially constant in the wavelength band.

8. The method according to claim 6, wherein metal structures in the control element are two-dimensionally arranged.

9. The method according to claim 6, wherein metal structures are coated with a coating layer composed of a dielectric material.

10. The method according to claim 6, wherein metal structures have any one of the shapes of a rectangular parallelepiped, an ellipse, a pyramid, a cylinder, a cone, a cross, and a ring, or a combination thereof.

* * * * *